Aug. 26, 1958  H. H. BRITTEN  2,849,662
STATIC INVERSE TIME OVERVOLTAGE DEVICE
Filed April 24, 1956
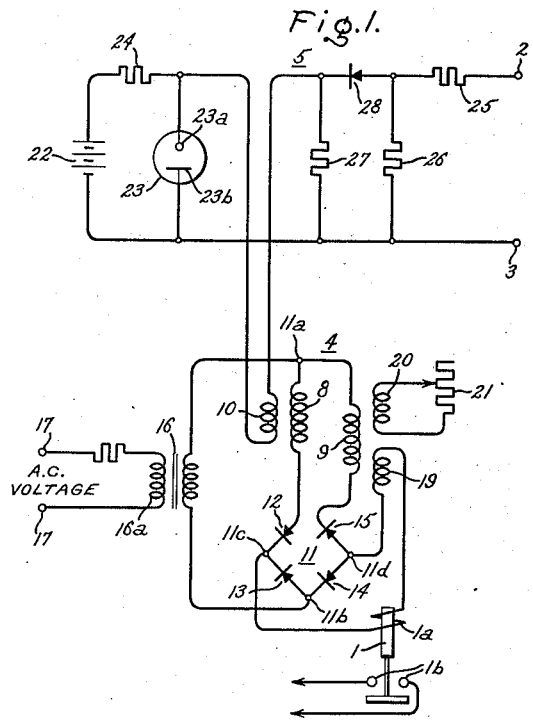
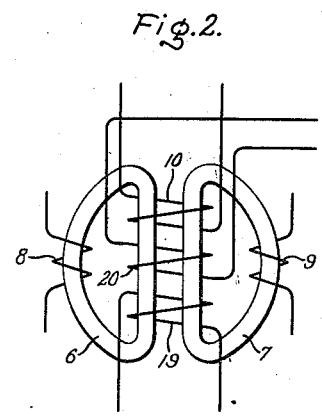
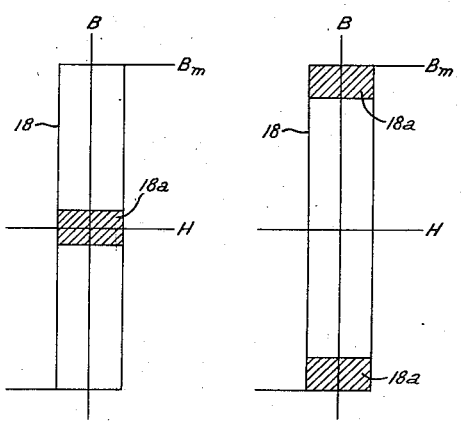
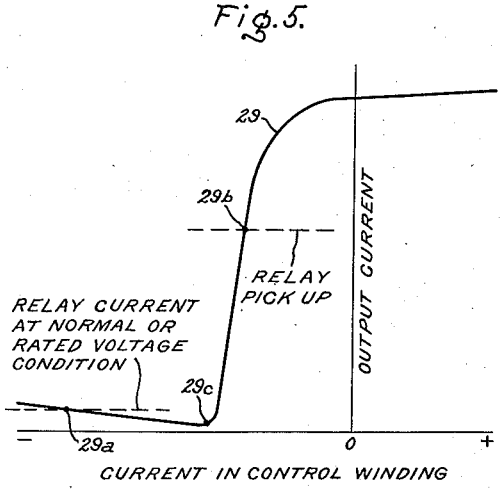
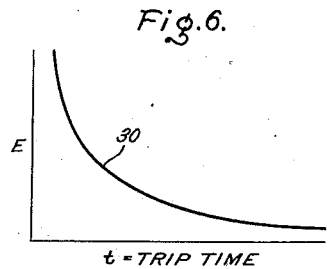
Inventor:
Harold H. Britten,
by Irving H. Marshman.
His Attorney.

United States Patent Office 2,849,662
Patented Aug. 26, 1958

2,849,662

STATIC INVERSE TIME OVERVOLTAGE DEVICE

Harold H. Britten, Waynesboro, Va., assignor to General Electric Company, a corporation of New York Application April 24, 1956, Serial No. 580,249

6 Claims. (Cl. 317—148)

This invention relates to time delay devices, more particularly to time delay devices which insert between the departure of some quantity or variable from a predetermined normal value and the operation of a control device a time delay which is inversely proportional to the magnitude of such departure, and it has for an object the provision of a simple, reliable, efficient and improved time delay device of this character. One example of such inverse time delay device is an inverse time overvoltage relay. Heretofore inverse time delay operation of relays has been achieved by use of an air dashpot. The accuracy of air dashpot devices is seriously impaired by environmental conditions. For example, when installed on a moving vehicle such as an aircraft, it suffers from the inaccuracies and failures normally associated with a mechanical device of this character when subjected to vibration, altitude and temperature changes. The performance specifications of many users of such a device require that its time delay characteristic remain relatively constant despite severe environmental changes, and accordingly a more specific object of this invention is the provision of a time delay device having the required constancy of time delay characteristic.

A further object of the invention is the provision of a time delay device in which the required inverse time delay characteristic is produced without the aid of moving parts.

For a better and more complete understanding of the invention, reference should now be had to the following specification and to the accompanying drawings of which Fig. 1 is a simple, schematic diagram of an embodiment of the invention, Fig. 2 is a diagrammatical sketch illustrating the arrangement of the winding on the core members of a magnetic amplifier which in itself constitutes an element of the device of Fig. 1, Figs. 3 and 4 are charts of characteristic curves of magnetic properties and operating conditions of the magnetic amplifier which facilitate an understanding of the invention, Fig. 5 is a characteristic curve which illustrates the relationship between the current in the input and output circuits of the magnetic amplifier and Fig. 6 is a curve which illustrates the inverse time characteristic of the invention.

Referring now to the drawings, a switching device 1 is to be operated e. g. picked up when the voltage at input terminals 2 and 3 exceeds a predetermined value which is hereinafter referred to as the normal value. For convenience, it may be regarded as the rated value of the voltage of a generator to the armature terminals of which the input terminals 2 and 3 are connected either directly or indirectly. The switching device 1 is illustrated as an electromagnetic relay having an operating coil 1a and a pair of normally open contacts 1b. The energization of the relay is controlled in response to overvoltage at the input terminals. This is accomplished by means of a magnetic amplifier 4 which in turn is controlled by means of a voltage comparison network 5 in which the voltage at the input terminals 2 and 3 is compared with a reference voltage and the difference utilized to control the saturation of the amplifier.

The magnetic amplifier 4 is illustrated as being of the internal feedback or self-saturating type. It is provided with a pair of toroidal core members 6 and 7 (Fig. 2) fabricated of a material having a relatively high permeability and a substantially rectangular hysteresis loop. In this connection there are a number of commercially available core materials such for example as the grain-oriented rectangular hysteresis loop nickel-iron alloys known as Permenorm, Orthonol and Deltamax and also certain cold-rolled silicon steel materials. On core member 6 is wound a reactance winding 8 and on core member 7 is wound a reactance winding 9. These windings 8 and 9 are connected in the load circuit of the reactor and are referred to as load circuit reactance windings. Linking both cores and preferably wound on top of the reactance windings 8 and 9 is a direct current control or input winding 10.

The load circuit reactance windings 8 and 9 are connected in separate arms of a full wave rectifying bridge 11 which comprises four individual rectifier units 12, 13, 14 and 15. These rectifiers may be of any suitable type. Preferably they are dry disk type rectifiers such as the well-known selenium, silicon or copper oxide rectifiers.

Alternating voltage is supplied to the input terminals 11a and 11b of the reactor rectifier bridge network from a suitable source such as transformer 16, of which the primary winding 16a is connected to be supplied from a suitable source of alternating voltage such as represented by the alternating voltage supply terminals 17. The transformer 16 is designed so that its core saturates during each half cycle of the alternating voltage supplied to its primary winding. Consequently it supplies to the load circuit reactance windings of the amplifier an alternating voltage of which the volt seconds per half cycle are approximately constant in all half cycles. The volt seconds of the alternating voltage supplied to the reactance windings is the integral of the instantaneous products of volts and time across the secondary winding of transformer 16 throughout a half cycle. The value of this integral in each of a number of successive half cycles will remain approximately constant if the transformer saturates in each half cycle of the applied voltage. The significance of constant volt seconds per half cycle in the operation of the overvoltage device is the insurance that the flux density swing in the core members 8 and 9 is constant and independent of variation in the line voltage of the alternating voltage source 17.

The magnitude of the alternating voltage that is supplied to the load circuit reactance windings 8 and 9 is such to cause a flux excursion in the cores 6 and 7 which is considerably less than the maximum possible as indicated in Fig. 3 by the shaded portion 18a of the rectangular hysteresis loop 18 for the high permeability material of which the cores are made. The inverse time device gives satisfactory operation when the flux excursion is in the region of 10% of the maximum possible. However 10% is not a limiting or a critical value. Entirely satisfactory operation will result for other values either greater or less than 10%.

A regenerative feedback winding 19 is wound on the core members 6 and 7. It is electrically connected in series with the operating coil 1a of the electromagnetic relay 1 to the output terminals 11c and 11d of the magnetic amplifier and is poled so that its magneto motive force adds to the magneto motive forces of the load circuit reactance windings 8 and 9.

Also wound upon and linking the cores 6 and 7 is an auxiliary control winding 20 across the terminals of which an adjustable resistor 21 is connected. Adjustment of the resistor 21 serves to vary the response time of the overvoltage device. The minimum trip time of the device is obtained when the resistor 21 is maximum and the maximum trip time is obtained when the resistor 21 is short circuited.

The voltage comparison network 5 comprises a source of reference voltage, means by which the voltage at the input terminals 2 and 3 or a predetermined percentage thereof is compared with the reference voltage and interconnections by means of which difference is supplied to the control winding 10 of the magnetic amplifier. Although any suitable reference voltage source may be employed, the source of direct voltage 22, glow discharge device 23 and series resistor 24 produce a direct reference voltage of the required degree of constancy at the anode-cathode 23A and 23B. The source of direct voltage 22 is illustrated as a battery, but of course it may be any other suitable source such as a rectifier supply source of alternating voltage. A voltage divider comprising series connected resistors 25 and 26 is connected across the input terminals 2 and 3 and a resistor 27 is connected in parallel with resistor 26 through a blocking rectifier 28. The cathode of the glow discharge valve 23 is connected to the negative input terminal 3 and also to the negative terminal of the direct voltage source 22. As thus connected, a voltage appears across resistor 27 which is proportional to the voltage across the input terminals 2 and 3. If this voltage is exactly equal to the reference voltage, i. e. the voltage across the anode and cathode of the glow discharge valve 23 zero current is supplied to the control winding 10 of the magnetic amplifier. If the voltage across resistor 27 exceeds the reference voltage, current flows in the control winding in a direction such that its magneto motive force adds to the magneto motive forces of the load circuit reactance windings 8 and 9 and conversely when the reference voltage exceeds the voltage across resistor 27, the direction of the current in the control winding is reversed so that the magneto motive force of the control winding supplies a negative bias to the flux to the cores. With the foregoing understanding of the elements and their organization, the operation of the overvoltage device will readily be understood from the following description.

The ratio of resistors 25 and 26 is chosen so that with rated or "normal" voltage at the terminals of the generator from which the input terminals 2 and 3 are supplied, the current supplied from the comparison network to the control winding 10 has a magnitude and direction such that a negative bias magnetic flux is applied to the core 6 and 7 of the magnetic amplifier. As a result of this negative bias, the current supplied from the amplifier to the operating coil 1a has a relatively low value which is represented in Fig. 5 by the ordinate 29a of the curve 29 of which abscissa represent current in the control winding 10 and ordinates represent output current of the amplifier. As illustrated in Fig. 5, the current supplied to the operating coil 1a in response to rated generated voltage at the input terminals 2 and 3 is substantially less than the pickup current value of switching device 1 which is graphically represented in Fig. 5 by the ordinate of point 29b.

Owing to the negative flux bias of cores 6 and 7 in response to normal generator voltage at the input terminals 2 and 3, the magnetic condition of the cores is graphically illustrated in the lower half of Fig. 4. The negative location of the flux excursion rectangle 18a on the flux density axis B below the zero axis of coordinates represents the magnitude of the negative bias.

If an overvoltage occurs at the input terminals, the voltage across the resistors 26 and 27 in the comparison network will exceed the reference voltage across the glow discharge valve 23 with the result that the current in the control winding 10 will be decreased to zero and ultimately reversed. As current in the control winding decreases the negative bias flux of the cores 6 and 7 decreases correspondingly with the result that the position of the flux excursions rectangle 18a moves upwardly toward the positive ordinate B$m$ which represents maximum flux density or saturation of the core. During the time in which the current in the control winding is decreasing from the value represented by the abscissa of point 29a to the value represented by abscissa of point 29c the output current of the magnetic amplifier is decreasing from a value represented by the ordinate of point 29a to a value represented by the ordinate of point 29c.

At the end of a time $t$ which is related to the magnitude of the overvoltage and to the electric and magnetic constants of the device, the alternating flux during an excursion attains the saturation value, i. e. the top of the flux excursion rectangle 18a rises slightly above the ordinate of B$m$ and the current in the load circuit windings 8 and 9, the feedback winding 19 and the operating coil 1a in the relay begins to increase. When the output current of the amplifier starts to increase, the feedback winding, owing to its regenerative action, produces a further increase in the rate of current increase such that it resembles snap action and the current quickly attains the value represented by the ordinate 29b and picks up the relay.

The relationship between the time $t$ required for the magnetic flux in the cores 6 and 7 to reach saturation after the occurrence of the overvoltage at input terminals 2 and 3, i. e. the time required for the flux excursion rectangle 18a to move from its lower position Fig. 4 to its upper position is defined by the equation:

$$(1) \qquad B = \frac{E_1 t \, 10^8}{AN}$$

or $$(2) \qquad t = \frac{BAN \, 10^{-8}}{E_1}$$

in which:

$E_1$ is a voltage that is proportional to the voltage E that is applied to input terminals 2 and 3 and is considered to exist only above normal voltage. The proportionality factor is a function of resistors 25, 26 and 21 and the ratio of turns 20 and 10.

$A$ = areas of cross section of cores 8 and 9

$N$ = turns of the control winding 10

$B = 2\, Bm - Bac$, in which $Bm$ = maximum flux density of core, i. e. saturation $Bac$ = magnitude of flux excursions produced by alternating voltage from transformer 16

It will be observed in Equations 1 and 2 that the time $t$ which elapses between the occurrence of the overvoltage at terminals 2 and 3 and the pickup of the electromagnetic switching device 1 is inversely proportional to the magnitude of the overvoltage $E_1$, as represented graphically by the curve 30 in Fig. 6.

Although in accordance with the provisions of the patent statutes, this invention is described as embodied in concrete form and the principle has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. A static inverse time overvoltage device comprising a magnetic amplifier having output terminals, a saturation control winding and a main load circuit reactance winding, means comprising a saturable core transformer for supplying to said load circuit reactance winding an alternating voltage of substantially constant volt seconds per cycle and having a magnitude substantially less than the magnitude required to produce flux excursions of maximum flux density in the magnetic structure of said amplifier, a pair of signal voltage input terminals, and means responsive to a predetermined normal value of signal voltage at said input terminals for establishing at said output terminals a relatively low value of output voltage and responsive to an overvoltage value of said signal voltage for producing at said output terminals a relatively large value of output voltage a predetermined interval of time after the occurrence of said overvoltage that is inversely proportional to the magnitude of said overvoltage comprising a source of reference voltage and electrical connections interconnecting said reference voltage source, said input terminals and said control winding supply a first current of one polarity in response to said predetermined normal voltage at said input terminals and a second current of another polarity to said control winding in response to an overvoltage at said input terminals.

2. A static inverse time overvoltage device comprising a magnetic amplifier having output terminals, a saturation control winding and a main load circuit reactance winding, means comprising a saturable transformer for supplying to said reactance winding an alternating voltage of constant volt seconds per cycle and having a magnitude approximately ten percent of the magnitude required to produce flux excursion of saturation flux density in the magnetic structure of said amplifier, a pair of signal voltage input terminals, and means responsive to a predetermined normal value of signal voltage at said input terminals for establishing at said output terminals a relatively low value of output voltage and responsive to an overvoltage value of said signal value for producing at said output terminals a relatively large value of output voltage an interval of time after the occurrence of said overvoltage that is inversely proportional to the magnitude thereof comprising a source of reference direct voltage and electrical connections interconnecting said reference voltage source, said input terminals and said control winding.

3. A static inverse time overvoltage device comprising a magnetic amplifier having output terminals, a magnetic core member, a saturation control winding and a main load circuit reactance winding mounted on said core member, means comprising a saturable transformer for supplying to said load circuit reactance winding an alternating voltage of substantially constant volt seconds per cycle, a pair of signal voltage input terminals, means responsive to a predetermined normal value of signal voltage at said input terminals for producing at said output terminals a relatively low voltage and responsive to an overvoltage value of said signal voltage for producing at said output terminals a relatively large value of output voltage a predetermined interval of time after the occurrence of said overvoltage that is inversely proportional to the magnitude of said overvoltage comprising a source reference direct voltage and electrical connections interconnecting said source, said input terminals and said control winding, and means for varying the response time of said amplifier to vary said inverse time interval comprising an auxiliary control winding mounted on said core member and an adjustable resistor connected across the terminals thereof.

4. A static inverse time overvoltage device comprising a magnetic amplifier having output terminals, a magnetic core member, a saturation control winding and a main load circuit reactance winding mounted on said core member, means comprising a saturable transformer for supplying to said load circuit reactance winding an alternating voltage of substantially constant volt seconds per cycle and having a magnitude substantially less than the magnitude required to produce flux excursions in said core member of saturation flux density, a pair of signal voltage input terminals, a switching device connected to be supplied from said output terminals and having first and second operating conditions, means responsive to a predetermined normal value of signal voltage for establishing said first operating condition of said switching device and responsive to an overvoltage value of said signal voltage for establishing said second operating condition an interval of time after the occurrence of said overvoltage that is inversely proportional to the magnitude thereof comprising a source of reference direct voltage and electrical connections interconnecting said reference voltage source, said control winding and said input terminals and a positive feedback winding on said core member supplied from said input terminals for effecting snap action transition of said switching device from said first operating condition to said second operating condition at the end of said time interval.

5. A static inverse time overvoltage device comprising a magnetic amplifier having output terminals, a saturation control winding and a main load reactance winding, means comprising a saturable core transformer for supplying to said reactance winding an alternating voltage of substantially constant volt seconds per cycle and having a magnitude substantially less than the magnitude required to produce flux excursions of maximum flux density in the magnetic structure of said amplifier, a pair of signal voltage input terminals, means responsive to a predetermined normal value of signal voltage at said input terminals for establishing at said output terminals a first value of output voltage and responsive to an overvoltage value of said output voltage for producing at said output terminals a second value of output voltage an interval of time after the occurrence of said overvoltage that is inversely proportional to the magnitude thereof comprising a source of reference direct voltage and electrical connections interconnecting said reference voltage source and said input terminals and said control winding and an electromagnetic switching device having an operating coil connected to be supplied from said output terminals and having a pair of contacts operable to a first operating position in response to said first value of output voltage and operable to a second operating position in response to said second value of output voltage.

6. A static inverse time overvoltage device comprising a magnetic amplifier having output terminals, a magnetic core member, a saturation control winding and a main load circuit reactance winding mounted on said core member, means comprising a saturable transformer for supplying to said load circuit reactance winding an alternating voltage of substantially constant volt seconds per cycle, a pair of signal voltage input terminals, means responsive to a predetermined normal value of signal voltage at said input terminals for producing at said output terminals, a first value of voltage and responsive to an overvoltage value of said signal voltage for producing at said output terminals a second value of voltage an interval of time after the occurrence of said overvoltage that is inversely proportional to the magnitude thereof comprising a source of reference direct voltage and electrical connections interconnecting said source, said input terminals and said control winding, an electromagetic switching device having an operating coil connected to be supplied from said output terminals and a pair of contacts operable to a first operating position in response to said first value of output voltage and operable to a second operating position in response to said second value of output voltage and means for varying the response time of said amplifier to adjust said inverse time interval comprising an auxiliary control winding on said core member and an adjustable resistor connected across the terminals thereof.

References Cited in the file of this patent

UNITED STATES PATENTS

| | | |
|---|---|---|
| 2,686,291 | Macklem | Aug. 10, 1954 |
| 2,725,517 | Rogers | Nov. 29, 1955 |
| 2,777,098 | Duffing | Jan. 8, 1957 |